United States Patent
Hashimoto (10) Patent No.: US 7,421,134 B2
(45) Date of Patent: Sep. 2, 2008

(54) IMAGE PROCESSING APPARATUS AND METHOD FOR MOVING OBJECT-ADAPTIVE COMPRESSION

(75) Inventor: Seiji Hashimoto, Osaka (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 782 days.

(21) Appl. No.: 10/734,204

(22) Filed: Dec. 15, 2003

(65) Prior Publication Data

US 2004/0179110 A1    Sep. 16, 2004

(30) Foreign Application Priority Data

Dec. 16, 2002    (JP)    ............... 2002-363238

(51) Int. Cl.
| | |
|---|---|
| G06K 9/00 | (2006.01) |
| G06K 9/36 | (2006.01) |
| G06K 9/46 | (2006.01) |
| H03M 7/34 | (2006.01) |
| H03M 7/38 | (2006.01) |
| H04B 1/66 | (2006.01) |
| H04N 1/00 | (2006.01) |
| H04N 7/12 | (2006.01) |
| H04N 11/02 | (2006.01) |
| H04N 11/04 | (2006.01) |

(52) U.S. Cl. .............. 382/239; 382/166; 382/248; 341/51; 348/395.1; 348/404.1; 358/426.04; 375/240.02; 375/240.19

(58) Field of Classification Search ............ 375/240.02, 375/240.03, 240.16, 240.18, 240.19, 240.2; 341/51; 348/395.1, 403.1–408.1; 358/426.02–426.08; 382/166, 239, 248, 251

See application file for complete search history.

(56) References Cited

U.S. PATENT DOCUMENTS 5,956,088 A  *  9/1999  Shen et al. ............. 375/240.25

(Continued)

FOREIGN PATENT DOCUMENTS

CN    1327687    12/2001

(Continued)

OTHER PUBLICATIONS

Piscaglia et al. ("ROI-based Multiresolution Compression of Heart MR Images," SPIE vol. 3335, Feb. 1998, pp. 583-594).*

(Continued)

*Primary Examiner*—Matthew C. Bella
*Assistant Examiner*—Yubin Hung
(74) *Attorney, Agent, or Firm*—Westerman, Hattori, Daniels & Adrian, LLP.

(57) ABSTRACT

An image processing apparatus is adapted to a surveillance camera system, and a CPU included in the surveillance camera system divides a plurality of continuous screens of an image signal into a plurality of blocks by each screen, and detects a specific object, which is an object with movement, from a luminance change of a Y signal found by a movement detection circuit. In addition, the CPU specifies the block in which a movement of the object is detected, and sets the specified block as an area to be noticed by taking advantage of an ROI function of a JPEG 2000. Next, a JPEG 2000 CODEC is instructed to compress an image of a movement-detected block into a high quality image by an alarm compression rate, and compress the image of a movement-not-detected block by a normal compression rate having a higher compression rate than the alarm compression rate. This enables to make a compression in such a manner that the image of the object with movement is rendered a higher quality image compared to the image of an object without movement.

5 Claims, 4 Drawing Sheets

U.S. PATENT DOCUMENTS

| | | | | |
|---|---|---|---|---|
| 6,917,384 B1* | 7/2005 | Fukushima | | 348/333.03 |
| 6,937,773 B1* | 8/2005 | Nozawa et al. | | 382/243 |
| 6,968,119 B1* | 11/2005 | Kaku | | 386/109 |
| 6,980,703 B2* | 12/2005 | Araki | | 382/305 |
| 7,257,264 B2* | 8/2007 | Nakayama et al. | | 382/239 |
| 2002/0080878 A1* | 6/2002 | Li | | 375/240.11 |
| 2002/0109780 A1* | 8/2002 | Kaku | | 348/231.99 |

FOREIGN PATENT DOCUMENTS

| | | | | |
|---|---|---|---|---|
| JP | 05075987 | A | * | 3/1993 |
| JP | 08181992 | A | * | 7/1996 |
| JP | 09200764 | A | * | 7/1997 |
| JP | 10-070716 | | | 3/1998 |
| JP | 10271515 | A | * | 10/1998 |
| JP | 2001036901 | A | * | 2/2001 |
| JP | 2001-177827 | | | 6/2001 |
| JP | 2001-230947 | | | 8/2001 |
| WO | WO 00/74386 | | | 12/2000 |

OTHER PUBLICATIONS

Office Action from the Japanese Patent Office dated Oct. 16, 2007 which issued in the basic Japanese patent application No. 2002-363238.

* cited by examiner

FIG. 4 ns apparatus. More specifically, the present invention relates to an image processing apparatus adapted to a surveillance camera system, and separately compressing a plurality of continuous screens of an image signal.

IMAGE PROCESSING APPARATUS AND METHOD FOR MOVING OBJECT-ADAPTIVE COMPRESSION

BACKGROUND OF THE INVENTION

1. Field of the Invention

The present invention relates to an image processing apparatus. More specifically, the present invention relates to an image processing apparatus adapted to a surveillance camera system, and separately compressing a plurality of continuous screens of an image signal.

2. Description of the Prior Art

One example of a conventional image processing apparatus is disclosed in Japanese Patent Laying-open No. 2001-230947. This image processing apparatus sets an area to be noticed by using an ROI (Region Of Interest) function of a JPEG 2000, and carries out a compression process in such a manner that an image of the set area to be noticed is rendered a higher quality image than the images in the other areas.

However, in the prior art, the area to be noticed is fixed, and therefore, in a case of an object with movement, there is a problem that it is not possible to compress the object with movement in such a manner that the image is rendered the high quality image.

SUMMARY OF THE INVENTION

Therefore, it is a primary object of the present invention to provide a novel image processing apparatus. It is another object of the present invention to provide an image processing apparatus capable of making a compression in such a manner that an image is rendered a high quality image even in a case of the object with movement.

The present invention is an image processing apparatus separately compressing a plurality of continuous screens of an image signal, and comprises: a detector for detecting a specified object with movement based on said plurality of screens of image signals; a first validater for validating a first compression rate regarding a first portion image corresponding to said specified object, of one screen in which said specified object exists; and a second validater for validating a second compression rate higher than said first compression rate regarding a second portion image corresponding to an object other than said specified object, of one screen in which said specified object exists.

The image processing apparatus separately compresses a plurality of continuous screens of an image signal one screen by one screen, and detects a specified object with movement based on the image signal of each screen. Furthermore, of one screen in which the specified object exists, regarding a first portion image corresponding to the specified object, a compression is carried out by a first compression rate. In addition, regarding a second portion image corresponding to the object other than the specified object in the same screen, a compression is carried out by a second compression rate higher than the first compression rate. In this case, it is possible to carry out the compression in such a manner that the image corresponding to the object with movement is rendered a higher quality image compared to the image corresponding to the object other than the specified object.

Preferably, regarding one screen in which the specified object does not exist, a compression is carried out by a third compression rate, which is the same compression rate as the second compression rate. In this case, it is possible to carry out the compression by the same compression rate across the entire screen so that a hard disk is put to an effective use.

Preferably, regarding a second portion image, a compression is carried out by a fourth compression rate, which is a higher compression rate than the second compression rate. In this case, an image size of the second portion image is rendered smaller than the image size in a case of being compressed by the second compression rate so that a hard disk is put to an effective use.

Preferably, a fourth compression rate is found in such a manner that an image size of one screen of a compressed image signal in which the specified object exists, and the image size of one screen of the compressed image signal in which the specified object does not exist satisfy a predetermined condition, and the second portion image is compressed by the found fourth compression rate.

Preferably, a fourth compression rate is found in such a manner that an image size of one screen of a compressed image signal in which the specified object exists conforms to the image size of one screen of the compressed image signal in which the specified object does not exist, and one screen of the second portion image in which the specified object exists is compressed by the found fourth compression rate. In this case, it is possible to dissolve an increasing amount of the image size in a case of compressing the first portion image by the first compression rate by a decreasing amount of the image size in a case of compressing the second portion image by the fourth compression rate. This enables to keep constant one screen of the compressed image size in which the object with movement exists.

Preferably, the plurality of continuous screens of an image signal are image signals output from a camera.

According to the present invention, in a case that an object moves in a plurality of continuous screens, a movement of the object is detected, and the compression rate is changeable according to the detected movement. This enables to carry out a compression in such a manner that the object with movement is rendered a high quality image.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
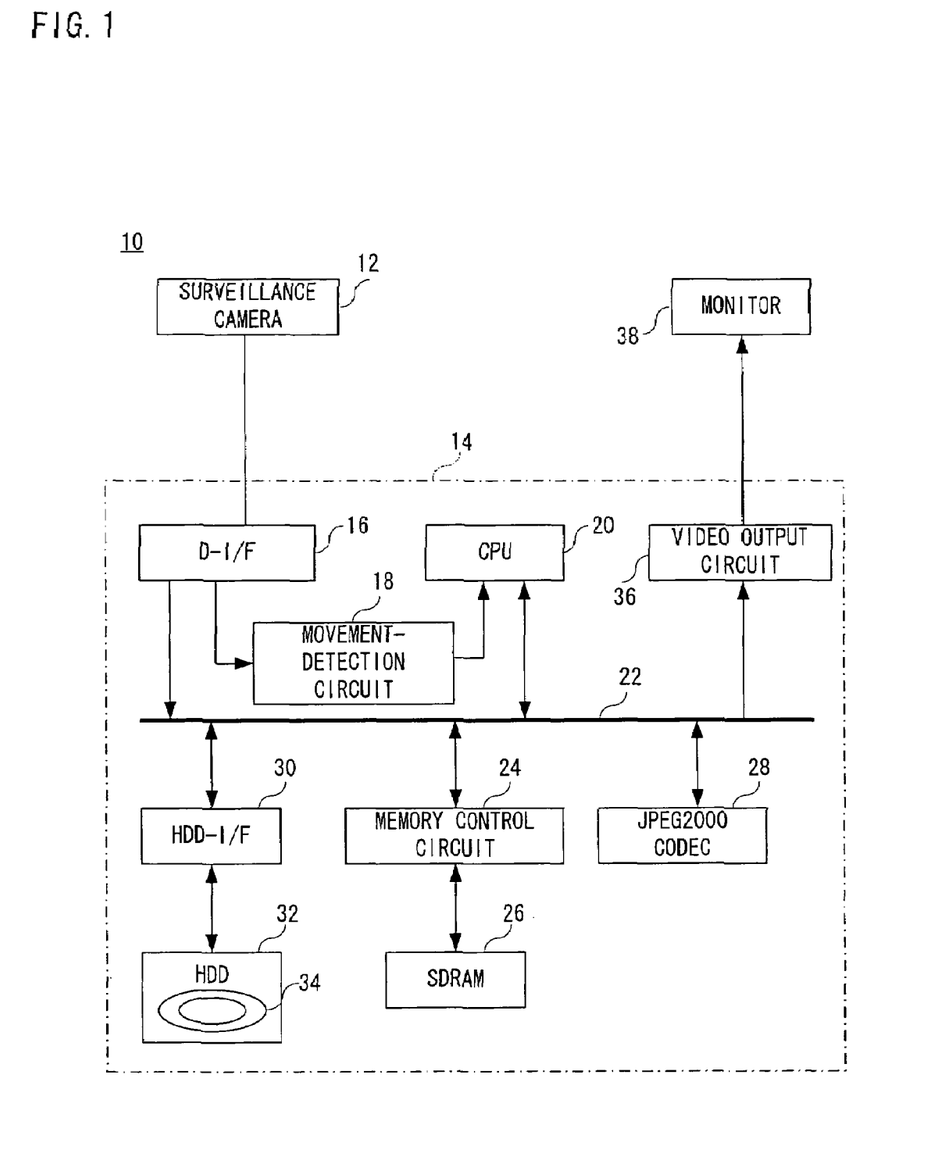
FIG. 1 is a block diagram showing one embodiment of the present invention.

Referring to FIG. 1, a surveillance camera system 10, e.g., a first embodiment of the present invention, includes a surveillance camera 12, a hard disk recorder 14, and a monitor 38. This surveillance camera system 10 is capable of compressing an image signal of an object photographed by the surveillance camera 12 so as to generate a compressed image signal, recording the generated compressed image signal into the hard disk recorder 14, and expanding the recorded compressed image signal so as to be displayed on the monitor 38.

The surveillance camera 12 observes whether or not any movement is made to the photographed object such as an intruder, and etc., and applies to the hard disk recorder 14 the image signal corresponding to the object by every one field period as an analog signal.

In the hard disk recorder 14, a D-I/F16, a CPU 20, a JPEG 2000 CODEC 28, a memory control circuit 24, an HDD-I/F 30, a video output circuit 36 are connected via a bus 22 to each other. A movement detection circuit 18 is connected to the D-I/F 16 and the CPU 20. The HDD 32 containing a hard disk 34 is connected to a HDD-I/F 30, and an SDRAM 26 to the memory control circuit 24, respectively.

The CPU 20 instructs the D-I/F 16 to fetch an analog image signal transmitted from the surveillance camera 12. The CPU 10 may instruct the D-I/F 16 to fetch the analog image signal transmitted from the surveillance camera 12 in a thinning-out manner. The D-I/F 16 converts the fetched analog image signal into an analog image signal in a YUV format, that is, a Y signal, which is a luminance signal, and a color difference signal, which is a U (R-Y) signal, and a V (B-Y) signal, by a video decoder (not shown) provided inside the D-I/F 16. Next, the D-I/F 16 converts the analog image signal in the YUV format into a digital image signal in the YUV format by an A/D conversion circuit (not shown) provided inside the D-I/F 16, and applies the converted digital image signal (hereinafter referred to as an "image signal") to the movement detection circuit 18, and the memory control unit 24, respectively.

Figure 2:
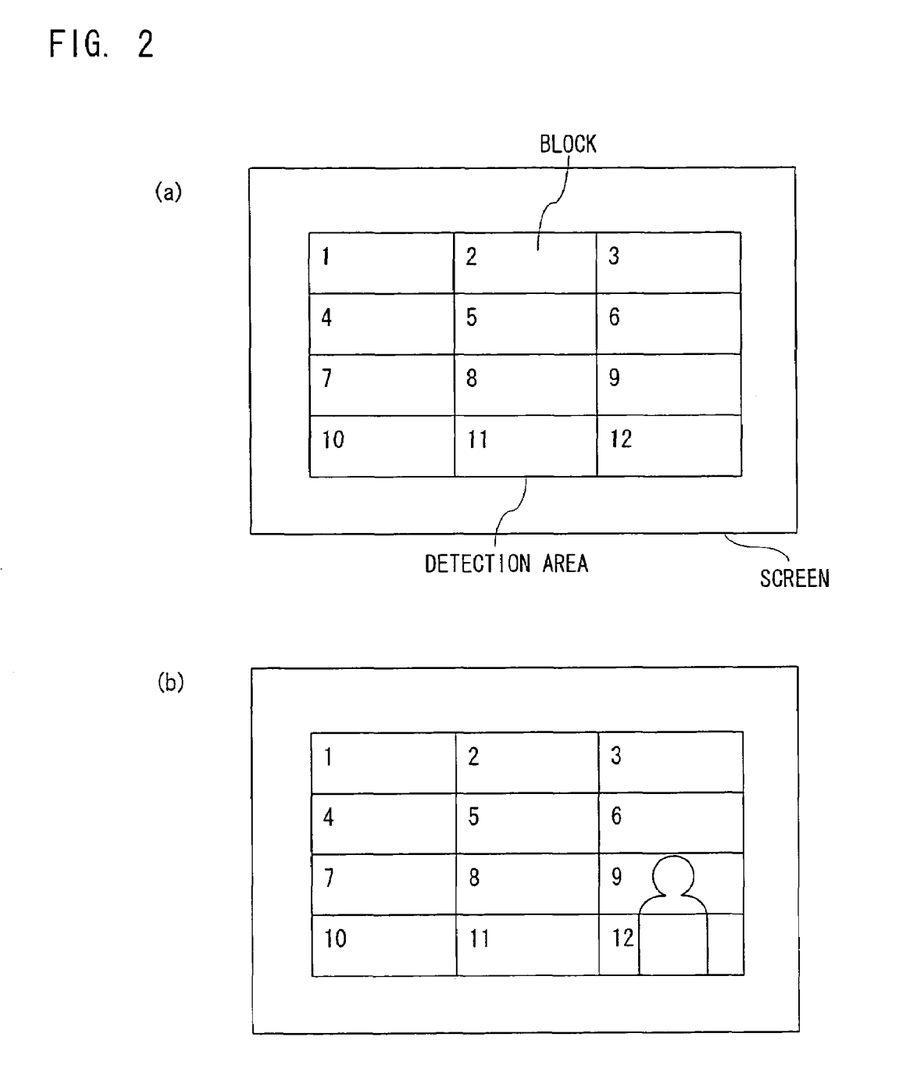
FIG. 2 is an illustrative view showing a block for detecting a movement of an object in the FIG. 1 embodiment.

The movement detection circuit 18 extracts from the applied image signal the Y signal, which is the luminance signal, and finds a luminance change based on a size of the Y signal in the current screen, and the size of the Y signal in the screen one field preceding to the current screen. The luminance change of the Y signal can be found by each block (3×4 blocks) dividing a detection area on the screen as shown in FIG. 2(*a*), for example. The luminance change of the Y signal to be found is applied to the CPU 20. It is noted that in place of the luminance change of the Y signal, a movement vector is found by each block, and the movement of the object may be detected from a size of the movement vector to be found.

Next, the CPU 20 determines whether or not the luminance change of the Y signal applied from the movement detection circuit 18 exceeds a detection threshold value set in advance. As a result, in a case of detecting the block having the luminance change exceeding the threshold value, the CPU 20 determines that there is the movement of the object in the block. Thus, a state in which it is determined that the luminance change of the Y signal found by the movement detection circuit 18 exceeds the detection threshold value is referred to as an internal alarm being detected. When the internal alarm is detected in a certain block, the CPU 20 specifies the block in which the internal alarm is detected. Next, toward the specified block, an ROI function of the JPEG 2000 is used so as to set an area to be noticed. In a case that the screen is developed from FIG. 2(*a*) to Figure (b), for example, there are the movements in blocks 9 and 12. This results in the internal alarm being detected in the blocks 9 and 12, and thus, the area to be noticed is set to these blocks.

On the other hand, the image signal applied from the D-I/F 16 to the memory control circuit 24 is written into the SDRAM 26.

The CPU 20 applies to the JPEG 2000 CODEC 28 an compression instruction of carrying out a compression at a compression rate stored in a register in advance. In receipt of the compression instruction, the JPEG CODEC 28 requests the memory control circuit 24 to read out the image signal. Next, the JPEG CODEC 2000 compresses the image signal read-out from the SDRAM 26 by the memory control circuit 24 based on the compression instruction from the CPU 20 at the predetermined compression rate stored in advance in the register of the CPU 20. This compression is performed according to a method defined by the JPEG 2000. At this time, in a case that the area to be noticed is set to the image signal to be compressed, the compression is carried out by the compression rate lower than the image of the area other than the area to be noticed in order to record the image of the area to be noticed in a high quality. In a case of FIG. 2(*b*), for example, the blocks 9 and 12 are set as the area to be noticed so that the CPU 20 instructs to compress the images in the blocks 9 and 12 at the compression rate lower than the images in the other blocks.

The JPEG 2000 CODEC 28 compresses the image signal so as to generate the compressed image signal, and requests the memory control circuit 24 to write the generated compressed image signal. At the request of the JPEG 2000 CODEC 28, the memory control circuit 24 writes the compressed image signal into the SDRAM 26.

Next, the CPU 20 applies to the HDD-I/F 30 a recording instruction of the compressed image signal. In accordance with the recording instruction from the CPU 20, the HDD-I/F 30 requests the memory control circuit 24 to read out the compressed image signal written in the SDRAM 26. The memory control circuit 24 reads out the compressed image signal from the SDRAM 26, and applies the read compressed image signal to the HDD 32. The HDD 32 records the applied compressed image signal into the hard disk 34 in a file format or its own format. It is noted that a file of the compressed image signal recorded in the hard disk 34 is managed in the order of photographing.

Next, a case of reproducing the compressed image signal recorded in the hard disk 34 will be described. First, the CPU 20 instructs the HDD-I/F 30 to read out the compressed image signal. The HDD-I/F 30 to which the reading-out instruction is applied controls the HDD 32, and sequentially reads out the compressed image signal from the hard disk 34 in the order of photographing.

Then, the CPU 20 instructs the memory control circuit 24 to write the read compressed image signal into the SDRAM 26. In receipt of the writing instruction, the memory control circuit 24 writes the compressed image signal into the SDRAM 26.

Next, the CPU 20 applies an expansion instruction to the JPEG 2000 CODEC 28. The JPEG 2000 CODEC 28 to which the expansion instruction is applied requests the memory control circuit 24 to read out the compressed image signal, and the memory control circuit 24 reads out the compressed image signal written in the SDRAM 26. The JPEG 2000 CODEC 28 expands the read compressed image signal according to a method defined by the JPEG 2000. In a case that the area to be noticed is set to the expanded image signal, the JPEG 2000 CODEC 28 expands the image of the area to be noticed, and the image other than the area to be noticed, using the compression rate at a time of compressing the both images, and generates the expanded image signal. The generated expanded image signal is applied to the memory control circuit 24, and the memory control circuit writes the applied expanded image signal into the SDRAM 26.

The CPU 20 applies a processing instruction to the video output circuit 36. The video output circuit 36 to which the processing instruction is applied requests the memory control circuit 24 to read out the expanded image signal by each one field period. The memory control circuit 24 reads out the expanded image signal from the SDRAM 26, and applies the read expanded image signal to the video output circuit 36

The video output circuit 36 encodes the applied expanded image signal into a composite image signal, and displays the encoded composite image signal on the screen of the monitor 38. At this time, the image of the block to which the area to be noticed is set is rendered a high quality image compared to the images in the other blocks. That is, in a case of reproducing the image of FIG. 2(*b*) on the monitor, the images in the blocks 9 and 12 have been rendered the high quality image compared to the images of the other blocks.

Figure 3:
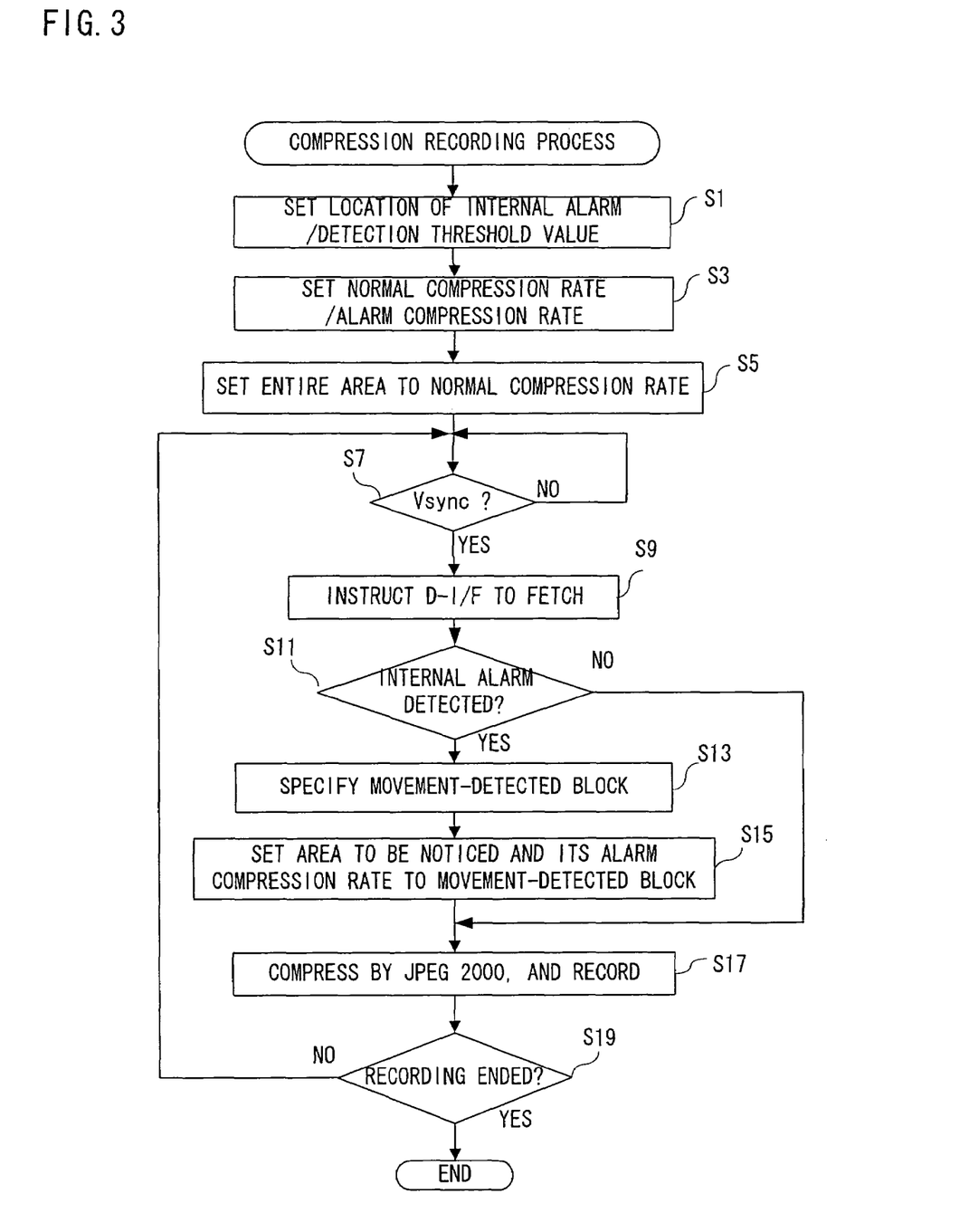
FIG. 3 is a flowchart showing one portion of the operation in the FIG. 1 embodiment.

Next, regarding a flow of a compression recording process of the image signal in this surveillance camera system 10, descriptions will be given using FIG. 3.

First, in a step S1, a location of the internal alarm, and a detection threshold value of the internal alarm are set. More specifically, as shown in FIG. 2(*a*), an arrangement of the block on the screen that finds the luminance change of the Y signal, and the detection threshold value, which is a reference of a size of the luminance change of the Y signal found by the movement detection circuit 18 are set.

Next, in a step S3, the compression rate used when compressing the image signal by the JPEG 2000 CODEC 28 is stored in the register of the CPU 20. Regarding the compression rate, there are an alarm compression rate used for compressing the image of a movement detection block, and a normal compression rate used for compressing the image of a movement-not-detected block.

Furthermore, in a step S5, the CPU 20 sets the compression rate of the image of the entire areas of the screen to the normal compression rate.

Next, in a step S7, the CPU 20 determines whether or not a vertical synchronizing signal is occurred. In a case that the vertical synchronizing signal is occurred, the D-I/F 16 is instructed to fetch the image signal from the surveillance camera 12 in a step S9. The D-I/F 16 converts the fetched analog image signal into the image signal in a YUV format. On the other hand, in a case that no vertical synchronizing signal is occurred, the process of the step S7 is repeated.

Next, in a step S11, the CPU 20 determines whether or not the internal alarm is detected. That is, the CPU 20 finds by each block by the movement detection circuit 18 a size of the luminance change from the size of the Y signal corresponding to the current screen, and the size of the Y signal corresponding to the screen one field preceding to the current screen. As a result, in a case that it is determined that the size of the luminance change to be found is larger than the stored detection threshold value, it is determined that the internal alarm is detected in the block. It is noted that in a case that the internal alarm is not detected, the CPU 20 instructs (step S17) to compress the image of the entire area of the screen at the normal compression rate.

Next, in a case that the internal alarm is detected, the CPU 20 further specifies the block in a step S13. That is, it is indicated that the object has moved in the specified block.

Then, using the ROI function of the JPEG 2000, the CPU 20 sets the area to be noticed in a step S15. That is, the CPU 20 finds the luminance change of the Y signal by each block, and sets the area to be noticed to the block having the luminance change to be found exceeding the detection threshold value.

In the step S17, the CPU 20 instructs the JPEG 2000 CODEC 28 to compress the image of the movement-detected block set as the area to be noticed at the alarm compression rate, and the image of the movement-not-detected block at the normal compression rate according to the method defined by the JPEG 2000, respectively. At this time, the alarm compression rate is set as the compression rate lower than the normal compression rate so that the compression is carried out in such a manner that the image of the area to be noticed is rendered the image of the high quality.

Then, in a step S19, the CPU 20 determines whether or not to end recording the image signal to the hard disk 34. In a case of ending the recording, the compression recording process is ended. On the other hand, in a case that there are still the image signals to be recorded, the process returns to the step S7. In this case, of a plurality of the blocks set in advance, even if the internal alarm is occurred in any block, it is possible to set the area to be noticed to the block in which the internal alarm is occurred, using the ROI function, thus possible to carry out the compression in such a manner that the image of the object moving on the screen is rendered the image of the high quality.

Figure 4:
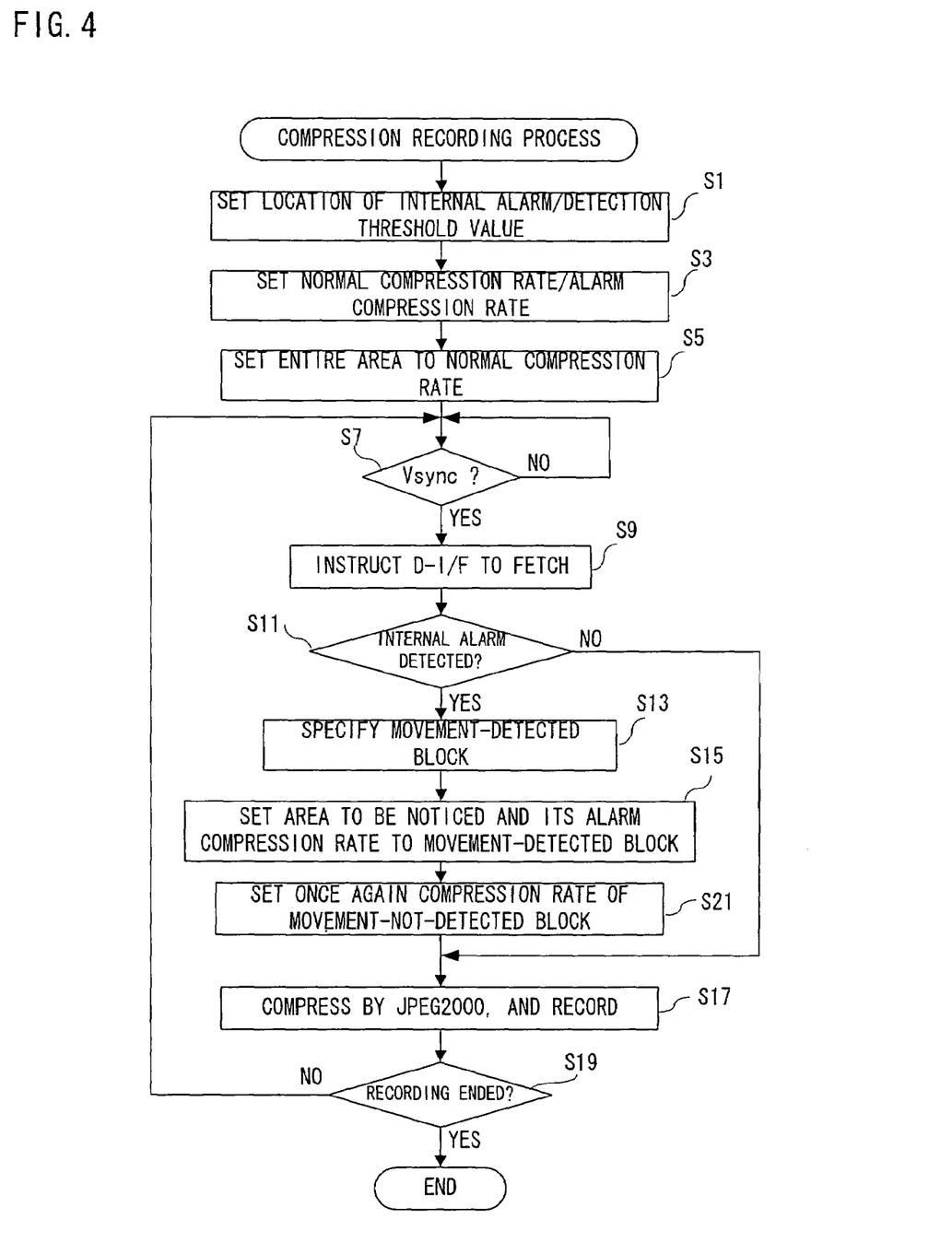
FIG. 4 is a flowchart showing one portion of the operation of another embodiment of the present invention.

Next, a second embodiment of the surveillance camera system 10 will be described. A block diagram and an illustrative view of the second embodiment are the same as FIG. 1 and FIG. 2 of the first embodiment so that its descriptions are omitted. In addition, in FIG. 4 showing a flow of the compression recording process of the second embodiment, the description in the steps of the same operation as the first embodiment is omitted by attaching the same step numbers, and steps different from the first embodiment will be mainly described.

Similar to the case of the first embodiment, the block in which the movement of the object is detected is rendered the area to be noticed, and the alarm compression rate is set (step S15). Next, in a step S21, the CPU 20 sets once again the compression rate of the image of the movement-not-detected block to a compression rate higher than the normal compression rate used in the first embodiment, and stores the same in the register.

Similar to the case of the first embodiment, the CPU 20 instructs the JPEG 2000 CODEC 28 (step S17) to compress the image of the movement-detected block in which the area to be noticed is set at the alarm compression rate, and the image of the movement-not-detected block at the compression rate set once again in the step S21, respectively, so as to generate the compressed image signal. Next, the CPU 20 instructs the HDD-I/F 30 (step S19) to record the generated compressed image signal into the hard disk 34.

In this case, an image size of the compressed image of the movement-detected block, which is the area to be noticed, is approximately the same as the image size of the compressed image of the movement-detected block, which is the area to be noticed of the first embodiment. However, it is possible to further minimize the image size of the compressed image of the movement-not-detected block than the image size of the compressed image of the movement-not-detected block of the first embodiment. Therefore, it is possible to make a recording time period of the hard disk longer.

It is noted that in the step S21, similar to the case that the decreasing amount of the image size in a case of compressing the image of the movement-not-detected block is dissolved by the increasing amount of the image size in a case of compressing the image of the movement-detected block at the alarm compression rate, the compression rate of the image of the movement-not-detected block may be set once again.

More specifically, the CPU 20 instructs the JPEG 2000 CODEC 28 to compress the image of the movement-detected block including the specified object at the alarm compression rate, and the image of the movement-not-detected block at a compression rate higher than the normal compression rate, respectively. The JPEG 2000 CODEC 28 compresses the images so as to generate the compressed image signal, and requests the memory control circuit 24 to write the generated compressed image signal. The memory control circuit 24 writes the compressed image signal into the SDRAM 26.

Next, the CPU 20 compares the image size of the compressed image including the specified object, and the image size of the compressed image having the image of all the blocks compressed at the normal compression rate. As a result, in a case that the image size of the compressed image including the specified object is larger, a CPU 60 instructs the JPEG 2000 CODEC once again to compress the image of the movement-detected block at the alarm compression rate, and the image of the movement-not-detected block at a compression rate higher than the normal compression rate, respectively.

Thus, the compression is repeated until the image size of the compressed image that compressed the image including the specified object is rendered equal to the image size of the compressed image that compressed the image of all the blocks at the normal compression rate. Then, when the image size of the compressed image including the specified object is rendered equal to the image size of the compressed image of all the blocks, the CPU 60 applies the compressed image signal including the specified object to the HDD 32, and allows the same to be recorded in the hard disk 34.

In this case, the increasing amount of the image size of the compressed image of the movement-detected block is rendered equal to the decreasing amount of the image size of the compressed image of the movement-not-detected block. Therefore, it is possible to render the image size of the entire compressed image equal to the image size of the compressed image that compressed the image of all the blocks at the normal compression rate. This enables to make the recording time period of the hard disk 34 yet longer.

It is noted that it may be possible that the image of the movement-detected block is compressed at the alarm compression rate, and the image of the movement-not-detected block at a compression rate taking into consideration the compression rate used at a time of the immediately preceding image compression, respectively, so as to generate the compressed image signal. That is, in a case that a compressed image size of the entire image formed of the movement-detected block and the movement-not-detected block is larger than a planned image size, in a subsequent compression, the compression rate is set to one level higher, for example, in such a manner that the image of the movement-not-detected block is further compressed. In contrary, in a case that the compressed image size of the entire image is smaller than the planned image size, in a subsequent compression, the compression rate is set to one level lower, for example, in such a manner that the image of the movement-not-detected block is not compressed than the current state. After this, the CPU 60 applies the compressed image signal including the specified object to the HDD 32, and allows the same to be recorded into the hard disk 34. This enables to make the recording time period of the hard disk 34 longer, and a time period required for the image compression shorter.

As understood from the above descriptions, the image processing apparatus for compressing the plurality of screens of an image signal by each screen divides into a plurality of blocks by each screen so as to find the size of the luminance change of the Y signal found by the movement detection circuit 18 by each block. Furthermore, from the size of the luminance change of the Y signal to be found, the object with movement (specified object) is detected, and the block in which the object with movement exists is specified. Next, of one screen in which the object with movement exists, the JPEG 2000 CODEC 28 is instructed to compress the first portion image, which is the image of the block in which the object with movement is detected, is compressed at the alarm compression rate (first compression rate), and the second portion image, which is the image of the block in which the object with movement is not detected, is compressed at the normal compression rate (second compression rate), which is a higher compression rate than the alarm compression rate. This enables to carry out a compression in such a manner that the first portion image is rendered the higher quality image compared to the second portion image.

The entire one screen in which the object with movement does not exist is compressed at the same compression rate as the normal compression rate (third compression rate). In this case, as a result of the entire one screen being compressed at the normal compression rate, which is a higher compression rate than the alarm compression rate, a recording time period of a hard disk 34 is rendered longer, thus possible to put the hard disk 34 to an effective use.

The second portion image is compressed at a compression rate (fourth compression rate) higher than the normal compression rate. This enables to render the compressed image size of the second portion image smaller, thus possible to put the hard disk to an effective use.

The fourth compression rate at which the image size of one screen of the compressed image signal in which an object with movement exists, and the image size of one screen of the compressed image signal in which no object with movement exists satisfy a predetermined size condition is found, and the second portion image is compressed by the fourth compression rate to be found.

The fourth compression rate at which the image size of one screen of the compressed image signal in which an object with movement exists, and the image size of one screen of the compressed image signal in which no object with movement exists are rendered the same is found, and one screen of the second image portion in which the object with movement exists is compressed at the fourth compression rate to be found. This makes it possible to dissolve the increasing amount of the image size in a case of compressing the first portion image at the alarm compression rate by the decreasing amount of the image size in a case of compressing the second portion image at the fourth compression rate. Thus, it is possible to maintain constant one screen of the compressed image size in which the object with movement exists.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing method separately compressing a plurality of continuous screens of an image signal, comprising steps of:
   (a) detecting a specified object with movement based on said plurality of continuous screens of an image signal;
   (b) validating a first compression rate regarding a first portion image corresponding to said specified object, of one screen in which said specified object exists;
   (c) validating a second compression rate higher than first said compression rate regarding a second portion image corresponding to an object other than said specified object, of one screen in which said specified object exists; and
   (d) validating a fourth compression rate higher than said second compression rate regarding said second portion image,
   wherein said fourth compression rate is a compression rate having a predetermined size condition satisfied between one screen of a compressed image signal in which said specified object exists, and one screen of the compressed image signal in which said specified object does not exist.

2. An image processing apparatus separately compressing a plurality of continuous screens of an image signal, comprising:
- a detector for detecting a specified object with movement based on said plurality of continuous screens of an image signal;
- a first validater for validating a first compression rate regarding a first portion image corresponding to the said specified object, of one screen in which said specified object exists;
- a second validater for validating a second compression rate higher than said first compression rate regarding a second portion image corresponding to an object other than said specified object, of one screen in which said specified object exists; and
- a fourth validater for validating a fourth compression rate higher than said second compression rate regarding said second portion image, wherein said fourth compression rate is a compression rate having a predetermined size condition satisfied between one screen of a compressed image signal in which said specified object exists, and one screen of the compressed image signal in which said specified object does not exist.

3. An image processing apparatus according to claim 2, further comprising
- a third validater for validating a third compression rate equal to said second compression rate regarding one screen in which said specified object does not exist.

4. An image processing apparatus according to claim 2, wherein said predetermined size condition is a condition that the size of the compressed image signal in which said object exists conforms with the size of the compressed image signal in which said object does not exist.

5. An image processing apparatus according to any one of claims 2, 3, or 4, wherein
said plurality of continuous screens of an image signal are image signals output from a camera.

* * * * *